(12) United States Patent
Seifert et al.

(10) Patent No.: US 9,657,133 B2
(45) Date of Patent: May 23, 2017

(54) RIGID POLYURETHANE FOAMS

(75) Inventors: Holger Seifert, Bohmte (DE); Johann Klassen, Stemwede-Oppendorf (DE); Louis Du Rieu, Bergen op Zoom (NL); Werner Wiegmann, Rahden-Wehe (DE); Guenter Matzke, Diepholz (DE)

(73) Assignee: BASF SE, Ludwigshafen (DE)

( * ) Notice: Subject to any disclaimer, the term of this patent is extended or adjusted under 35 U.S.C. 154(b) by 643 days.

(21) Appl. No.: 12/522,002

(22) PCT Filed: Jan. 9, 2008

(86) PCT No.: PCT/EP2008/050171
§ 371 (c)(1),
(2), (4) Date: Jul. 2, 2009

(87) PCT Pub. No.: WO2008/084054
PCT Pub. Date: Jul. 17, 2008

(65) Prior Publication Data
US 2010/0016461 A1    Jan. 21, 2010

(30) Foreign Application Priority Data
Jan. 12, 2007 (EP) .................... 07100482

(51) Int. Cl.
*C08G 18/76* (2006.01)
*C08G 18/79* (2006.01)
*C08G 18/48* (2006.01)

(52) U.S. Cl.
CPC ....... *C08G 18/7664* (2013.01); *C08G 18/797* (2013.01); *C08G 18/4804* (2013.01)

(58) Field of Classification Search
CPC ............ C08G 17/7664; C08G 18/7664; C08G 18/4804
USPC ........................................ 521/170, 174, 155
See application file for complete search history.

(56) References Cited

U.S. PATENT DOCUMENTS

| | | | | |
|---|---|---|---|---|
| 3,479,384 A * | 11/1969 | Heiss | ............................ | 560/347 |
| 5,491,252 A * | 2/1996 | Narayan et al. | ................. | 560/26 |
| 5,510,053 A * | 4/1996 | Narayan et al. | ............ | 252/182.2 |
| 5,530,034 A * | 6/1996 | Narayan et al. | ............... | 521/159 |
| 5,539,009 A * | 7/1996 | Narayan et al. | ............... | 521/159 |
| 6,248,802 B1 * | 6/2001 | Singh et al. | .................... | 521/131 |
| 6,262,139 B1 * | 7/2001 | Narayan et al. | ............... | 521/159 |
| 6,306,920 B1 * | 10/2001 | Heinemann et al. | ......... | 521/174 |
| 6,455,601 B1 * | 9/2002 | Singh et al. | .................... | 521/131 |
| 6,590,005 B2 * | 7/2003 | Singh et al. | .................... | 521/131 |
| 6,765,034 B2 * | 7/2004 | Nishida et al. | .................. | 521/170 |
| 7,893,124 B2 * | 2/2011 | Emge | .................. | C08G 18/482 521/130 |
| 2002/0022674 A1 * | 2/2002 | Singh et al. | .................... | 521/131 |
| 2003/0078310 A1 * | 4/2003 | Singh et al. | .................... | 521/131 |
| 2004/0082465 A1 * | 4/2004 | Kiso et al. | ..................... | 502/167 |
| 2009/0253819 A1 * | 10/2009 | Reese et al. | ................... | 521/159 |
| 2010/0076101 A1 * | 3/2010 | Reese et al. | ................... | 521/128 |
| 2011/0201708 A1 | 8/2011 | Athey et al. | | |

FOREIGN PATENT DOCUMENTS

| | | |
|---|---|---|
| DE | 102004048728 A1 * | 6/2006 |
| EP | 0 294 110 | 12/1988 |
| EP | 1 304 349 A1 | 4/2003 |
| EP | 1 518 874 | 3/2005 |
| JP | 07-188370 | 7/1995 |
| WO | 2006/042674 A1 | 4/2006 |

OTHER PUBLICATIONS

English abstract of EP1518874 from the European Patent Office.*
Machine translation of EP1518874 from the European Patent Office.*
"Blowing agent options for insulation foam after HCFC phase out", Huntsman Corporation, © 2011, accessed on the Huntsman website on Jun. 18, 2015.*
European Notice of Opposition issued Apr. 26, 2011, in European Patent Application No. EP08701336.3 filed Jan. 9, 2008.
Opposition Proceeding dated Sep. 24, 2012.
Opposition Proceeding dated Oct. 19, 2012.
Woods, G., The ICI Polyurethanes Book, John Wiley & Sons, $2^{nd}$ ed., ISBN 0-471-92658-2, pp. 127-173 (1990).
Randall, D., and Lee, S., The Polyurethanes Book. John Wiley & Sons, ISBN 0-470-85041-8, pp. 229-284 (2002).
Brochhagen, et al., "PU Rigid Foam", In: Polyurethane Handbook, Edited by G. Oertel, Muenchen: Carl Hanser Verlag, pp. 234-314 (1985).
Lee, S., The Polyurethanes Book, Huntsman International LLC, ISBN 0-470-85041-8, p. 84 (2002).
FTIR spectrum of Suprasec 5025, which is polymeric MDI, viscosity 210 cps, ± 42 wt% diiso (Oct. 19, 2012).

* cited by examiner

*Primary Examiner* — Melissa Rioja
(74) *Attorney, Agent, or Firm* — Oblon, McClelland, Maier & Neustadt, L.L.P.

(57) ABSTRACT

The invention relates to rigid polyurethane foams which can be produced by reacting
a) polyisocyanates with
b) compounds having at least two hydrogen atoms which are reacted toward isocyanate groups in the presence of
c) blowing agents,
wherein the polyisocyanate a) used is a mixture of diphenylmethane diisocyanate and polyphenylenepolymethylene polyisocyanates comprising
a1) 30-35% by weight of diphenylmethane diisocyanate,
a2) 21-28% by weight of polyphenylenepolymethylene polyisocyanate having three aromatic rings,
a3) 8-13% by weight of polyphenylenepolymethylene polyisocyanate having four aromatic rings,
a4) 24-41% by weight of polyphenylenepolymethylene polyisocyanate having five or more aromatic rings,
where the percentages by weight of the components a1) to a4) are based on the total weight of the components a1) to a4) and add up to 100% by weight.

18 Claims, No Drawings

RIGID POLYURETHANE FOAMS

This application is a National Stage of PCT/EP2008/050171, which was filed on Jan. 9, 2008. This application is based upon and claims the benefit of priority to European Application No. 07100482.4, which was filed on Jan. 12, 2007.

The invention relates to rigid polyurethane foams, their production and a polyisocyanate component for producing the rigid polyurethane foams.

Rigid polyurethane foams have been known for a long time and have been described widely. Rigid polyurethane foams are used predominantly for thermally insulation, for example in refrigeration appliances, transport means or buildings and for producing structural elements, in particular sandwich elements.

They are customarily produced by reacting polyisocyanates, usually diphenylmethane diisocyanate (MDI) and in particular mixtures of diphenylmethane diisocyanate and its higher homologues polyphenylenepolymethylene polyisocyanates (crude MDI), with compounds having at least two hydrogen atoms which are reactive toward isocyanate groups.

An important requirement which rigid polyurethane foams have to meet is dimensional stability. Dimensional stability means that the foam does not change its volume, in particular does not shrink, after curing. In the case of rigid foams, shrinkage can result in voids in the foam and also detachment of covering layers. The shrinkage problem is particularly prevalent in large moldings and there is no information as to how this may be solved.

Furthermore, the market is increasingly demanding foams which can be removed from the mold quickly. An excessively long demolding time is particularly troublesome in applications in which the foam is used in relatively thick layers, in particular at least 60 mm.

It was therefore an object of the invention to provide rigid polyurethane foams which have good processing properties in particular a short demolding time, and good use properties, in particular good dimensional stability. These advantageous properties should also be obtained at a low density, preferably a core foam density of <30 g/l. Furthermore, the market demands for light-colored foams should be addressed.

This object has surprisingly been able to be achieved by the use of a mixture of diphenylmethane diisocyanates and polyphenylenepolymethylene polyisocyanates having a specific composition as isocyanate component in production of the foams.

The invention accordingly provides rigid polyurethane foams which can be produced by reacting
a) polyisocyanates with
b) compounds having at least two hydrogen atoms which are reacted toward isocyanate groups in the presence of
c) blowing agents,
wherein the polyisocyanate a) used is a mixture of diphenylmethane diisocyanate and polyphenylenepolymethylene polyisocyanates comprising
a1) 30-35% by weight of diphenylmethane diisocyanate,
a2) 21-28% by weight of polyphenylenepolymethylene polyisocyanate having three aromatic rings,
a3) 8-13% by weight of polyphenylenepolymethylene polyisocyanate having four aromatic rings,
a4) 24-41% by weight of polyphenylenepolymethylene polyisocyanate having five or more aromatic rings,
where the percentages by weight of the components a1) to a4) are based on the total weight of the components a1) to a4) and add up to 100% by weight.

The invention further provides a process for producing the rigid polyurethane foams of the invention.

The invention further provides a polyphenylenepolymethylene polyisocyanate mixture comprising
a1) 30-35% by weight of diphenylmethane diisocyanate,
a2) 21-28% by weight of polyphenylenepolymethylene polyisocyanate having three aromatic rings,
a3) 8-13% by weight of polyphenylenepolymethylene polyisocyanate having four aromatic rings,
a4) 24-41% by weight of polyphenylenepolymethylene polyisocyanate having five or more aromatic rings,
where the percentages by weight of the components a1) to a4) are based on the total weight of the components a1) to a4) and add up to 100% by weight.

In a preferred embodiment of the invention, the isocyanate component a) used for producing the rigid polyurethane foams comprises less than 12% by weight, particularly preferably less than 10% by weight and in particular less than 8% by weight, in each case based on the weight of the component a), of uretonimine. Foams produced using such an isocyanate component a) have a particularly low shrinkage, a particularly good dimensional stability and a particularly light color.

The uretonimine content is determined here from the C=O vibration at 1740 $cm^{-1}$ using 1,3-di-p-tolyl-2-p-tolylimino-1,3-diazetidine-4-one calibration and is converted with the aid of the molecular weight to the uretonimine of 4,4'-MDI according to equation (1):

$$\text{mg of uretonimine} = \text{absorbance as area} * 13.975 \quad (1).$$

The component a) preferably has a content of free NCO end groups of from 30 to 33% by weight.

Polyphenylenepolymethylene polyisocyanate usually comprises from 12 to 18% by weight of uretonimine. It is usually prepared by acid-catalyzed reaction of aniline with formaldehyde and reaction of the resulting mixture of diphenylmethanediamine MDA and polymethylenepolyphenylenepolyamine with phosgene to form MDI and subsequent work-up and, if appropriate, partial removal of the 2-ring MDI. The condensation is carried out at such a ratio of aniline to formaldehyde that the desired ratio of the isomers of the homologues is obtained in the MDA. After the phosgenation, the product mixture is freed of volatile accompanying substances and by-products, mostly chlorine-comprising compounds, by distillation. To adjust the reactivity, a thermal after-treatment can be carried out. If this thermal stressing by this distillation and treatment is minimized, an MDI having a uretonime content up to a maximum of 12% by weight, preferably less than 10% by weight and particularly preferably less than 8% by weight, results.

In the distillation step for adjusting the component a1), too, thermal stressing by distillation and treatment has to be minimized in order to achieve uretonimine contents of up to a maximum of 12% by weight, preferably less than 10% by weight and particularly preferably less than 8% by weight.

In a further advantageous embodiment of the invention, the compounds having at least two hydrogen atoms which are reactive toward isocyanates comprise at least one polyether alcohol b1) which has been prepared by addition of alkylene oxides onto an aromatic amine. The hydroxyl number of this polyether alcohol is, in particular, in the range 300-500 mg KOH/g. As aromatic amine, preference is given to using toluenediamine which particularly preferably comprises at least 95% by weight, based on the weight of the toluenediamine, of ortho isomers.

Furthermore, the compounds having at least two hydrogen atoms which are reactive toward isocyanates preferably comprise at least one polyether alcohol b2) which has been prepared by addition of alkylene oxides onto a sugar, for example sorbital and/or sucrose, particularly preferably sucrose. The hydroxyl number of this polyether alcohol is, in particular, in the range 350-550 mg KOH/g.

In a further, particularly preferred embodiment of the invention, the compounds having at least two hydrogen atoms which are reactive toward isocyanates comprise at least one polyether alcohol b1) and at least one polyether alcohol b2). The weight ratio of the polyols b1):b2) is preferably in the range from 1:1 to 1:6.

To produce the rigid polyurethane foams, the polyisocyanates a) and the compounds b) having at least two hydrogen atoms which are reactive toward isocyanate groups are reacted in such amounts that the isocyanate index is in the range from 100 to 220, preferably from 110 to 195.

The rigid polyurethane foams can be produced batchwise or continuously by means of known mixing apparatuses.

The rigid polyurethane foams of the invention are usually produced by the two-component process. In this process, the compounds b) having at least two hydrogen atoms which are reactive toward isocyanate groups are mixed with the flame retardants, the blowing agents, the catalysts and the further auxiliaries and/or additives to form the polyol component and this is reacted with the polyisocyanates or mixtures of the polyisocyanates and, if appropriate, flame retardants and blowing agents, also referred to as isocyanate component.

The starting components are usually mixed at a temperature of from 15 to 35° C., preferably from 20 to 30° C. The reaction mixture can be fed into closed support tools by means of high- or low-pressure metering machines. For example, sandwich elements are manufactured batchwise by means of this technology.

The rigid polyurethane foams of the invention are surprisingly very readily removed from the mold. The foams are dimensionally stable and can be applied very well.

As regards the other starting compounds used for producing the rigid polyurethane foams of the invention, the following details may be provided:

As compounds b) having at least two hydrogen atoms which are reactive toward isocyanate which can be used together with the polyether alcohols b1) and b2) for the process of the invention, use can be made of, in particular, polyether alcohols and/or polyester alcohols having OH numbers in the range from 100 to 1200 mg KOH/g.

The polyester alcohols used are usually prepared by condensation of polyfunctional alcohols, preferably diols, having from 2 to 12 carbon atoms, preferably from 2 to 6 carbon atoms, with polyfunctional carboxylic acids having from 2 to 12 carbon atoms, for example succinic acid, glutaric acid, adipic acid, suberic acid, azelaic acid, sebacic acid, decanedicarboxylic acid, maleic acid, fumaric acid and preferably phthalic acid, isophthalic acid, terephthalic acid and the isomeric naphthalenedicarboxylic acids.

The polyether alcohols used usually have a functionality of from 2 to 8, in particular from 3 to 8.

In particular, use is made of polyether alcohols prepared by known methods, for example by anionic polymerization of alkylene hydroxides in the presence of catalysts, preferably alkali metal hydroxides and/or amines.

As alkylene oxides, use is usually made of ethylene oxide and/or propylene oxide, preferably pure 1,2-propylene oxide.

Starter molecules used are, in particular, compounds having at least 3, preferably from 4 to 8, hydroxyl groups or at least two primary amino groups in the molecule.

As starter molecules having at least 3, preferably from 4 to 8, hydroxyl groups in the molecule, preference is given to using trimethylolpropane, glycerol, pentaerythritol, sugar compounds such as glucose, sorbitol, manitol and sucrose, polyhydric phenols, resoles such as oligomeric condensation products of phenol and formaldehyde and Mannich condensates of phenol, formaldehyde and dialkanolamines and also melamine.

As starter molecules having at least two primary amino groups in the molecule, preference is given to using aromatic diamine and/or polyamines, for example phenylenediamines, 2,3-, 2,4-, 3,4- and 2,6-toluenediamine and 4,4'-, 2,4'- and 2,2'-diamino-diphenylmethane, and also aliphatic diamines and polyamines, e.g. ethylenediamine.

The polyether alcohols have a functionality of preferably from 3 to 8 and hydroxyl numbers of preferably from 100 mg KOH/g to 1200 mg KOH/g and in particular from 240 mg KOH/g to 570 mg KOH/g. It is also possible to use additional polyols, in particular polyether alcohols having a hydroxyl number of 100-250 mg KOH/g and a functionality of from 2.5 to 4. The properties of the foams can be adjusted in this way.

The compounds (A) having at least two hydrogen atoms which are reactive toward isocyanate also include the chain extenders and crosslinkers which may be concomitantly used. The addition of bifunctional chain extenders, trifunctional and higher-functional crosslinkers or, if appropriate, mixtures thereof can prove to be advantageous for modifying the mechanical properties. As chain extenders and/or crosslinkers, preference is given to using alkanolamines and in particular diols and/or triols having molecular weights of less than 400, preferably from 60 to 300.

Chain extenders, crosslinkers or mixtures thereof are advantageously used in an amount of from 1 to 20% by weight, preferably from 2 to 10% by weight, based on the component b).

Further information on the polyether alcohols and polyester alcohols used and their preparation may be found, for example, in Kunststoffhandbuch, volume 7 "Polyurethane", edited by Günter Oertel, Carl-Hanser-Verlag Munich, 3rd edition, 1993.

As blowing agents c), it is possible to use water which reacts with isocyanate groups to eliminate carbon dioxide. It is also possible to use physical blowing agents in combination with or in place of water. These are compounds which are inert toward the starting components and are usually liquid at room temperature and vaporize under the conditions of the urethane reaction. The boiling point of these compounds is preferably below 50° C. Physical blowing agents also include compounds which are gaseous at room temperature and are introduced under pressure into the starting component or are dissolved therein, for example carbon dioxide, low-boiling alkanes and fluoroalkanes or fluoroalkenes.

These compounds are usually selected from the group consisting of alkanes and cycloalkanes having at least 4 carbon atoms, dialkyl ethers, esters, ketones, acetals, fluoroalkanes and fluoroalkenes having from 1 to 8 carbon atoms and tetraalkylsilanes having from 1 to 3 carbon atoms in the alkyl chain, in particular tetramethylsilane.

Examples which may be mentioned are propane, n-butane, isobutene and cyclobutane, n-pentane, isopentane and cyclopentane, cyclohexane, dimethyl ether, methyl ethyl ether, methyl butyl ether, methyl formate, acetone and also fluoroalkanes which can be degraded in the troposphere and therefore do not damage the ozone layer, e.g. trifluoromethane, difluoromethane, 1,1,1,3,3-pentafluorobutane, 1,1,1,3,3-pentafluoropropane, 1,1,1,2-tetrafluoroethane, difluoroethane and heptafluoropropane. Particular preference is given to using cyclopentane and/or n-pentane. The physical blowing agents mentioned can be used either alone or in any combinations with one another.

Catalysts used are, in particular, compounds which strongly accelerate the reaction of the isocyanate groups with the groups which are reactive toward isocyanate groups. Such catalysts are strongly basic amines, e.g. tertiary aliphatic amines, imidazols, amidines, and alkanolamines.

To produce the rigid polyurethane foams, the compounds b) having at least two hydrogen atoms which are reactive toward isocyanates and the polyisocyanates a) are reacted in such amounts that the isocyanate index is in the range from 100 to 220, preferably from 110 to 195.

If isocyanurate groups are to be incorporated into the rigid foam, specific catalysts are required. As isocyanurate catalysts, use is usually made of metal carboxylates, in particular potassium acetate and solutions thereof. In the production of such foams, also referred to as polyurethane-polyisocyanurate foams, the reaction of the components (A) and (B) is usually carried out at an index of from 160 to 450.

The rigid PUR foams of the invention are usually produced by the two-component process. In this process, the compounds (A) having at least two hydrogen atoms which are reactive toward isocyanate groups are mixed with the flame retardants, the blowing agents, the catalysts and the further auxiliaries and/or additives to form the polyol component and this is reacted with the polyisocyanates or mixtures of the polyisocyanates and, if appropriate, flame retardants and blowing agents, also referred to as isocyanate component.

The starting components are usually mixed at a temperature of from 15 to 35° C., preferably from 20 to 30° C. The reaction mixture can be fed into closed support tools using high- or low-pressure metering machines. For example, sandwich elements are manufactured batchwise by means of this technology.

The rigid polyurethane foams can be produced batchwise or continuously with the aid of known mixing apparatuses.

The rigid polyurethane foams of the invention are surprisingly very readily removed from the mold. The foams are dimensionally stable and can be applied very well.

The rigid polyurethane foams produced by the process of the invention have a density of less than 38 g/l when only water is used as blowing agent. When physical blowing agents are concomitantly used, the density of the rigid polyurethane foams is preferably in the range from 28 to 33 g/l.

Even at these low densities, the rigid polyurethane foams of the invention surprisingly undergo no shrinkage.

The invention is illustrated by the following examples.

1.1 Preparation of the Polyol Component 1:

A polyol component was prepared by mixing 520 g of a polyether polyol based on sucrose, glycerol and propylene oxide and having a mean molecular weight of 640 g/mol, 250 g of a polyether alcohol based on vicinalem TDA, ethylene oxide and propylene oxide and having a mean molecular weight of 575 g/mol, 160 g of a polyether alcohol based on vicinalem TDA, ethylene oxide and propylene oxide and having a mean molecular weight of 1400 g/mol, 20 g of a foam stabilizer, 16.5 g of Polycat 8, 6.5 g of Polycat 5, 3.5 g of Polycat 41, 24 g of water and 14 g of cyclopentane.

1.2 Preparation of the Polyol Component 2:

A polyol component was prepared by mixing 520 g of a polyether alcohol based on sucrose, glycerol and propylene oxide and having a mean molecular weight of 640 g/mol, 250 g of a polyether alcohol based on vicinalem TDA, ethylene oxide and propylene oxide and having a mean molecular weight of 575 g/mol, 160 g of a polyether alcohol based on vicinalem TDA, ethylene oxide and propylene oxide and having a mean molecular weight of 1400 g/mol, 20 g of a foam stabilizer, 16.5 g of Polycat 8, 6.5 g of Polycat 5, 3.5 g of Polycat 41, 24 g of water and 17 g of cyclopentane.

1.3 Production of the Rigid PU Foam (not According to the Invention)

Polyphenylenepolymethylene polyisocyanate (trade name: Lupranat® M20S) having a monomeric MDI content of 39%, 29% by weight of polyphenylenepolymethylene polyisocyanate having three aromatic rings, 12% by weight of polyphenylenepolymethylene polyisocyanate having four aromatic rings, 20% by weight of polyphenylenepolymethylene polyisocyanate having five or more aromatic rings, an NCO content of from 31.2% by weight, a viscosity of 252 mPa·s at 25° C. and a uretonimine content of 14% was mixed with the polyol component 1 in a ratio of polyol:isocyanate=100:121 used in a high-pressure metering machine. This mixture was injected into a lance mold (2000×200×50 mm) or a box mold (700×400×90 mm).

This gave a rigid PU foam which had the following characteristics:
Fiber time: 41 sec
Foam density: 35 g/l
Demolding thickness after 4 minutes at 15% overfilling: 93 mm
Flow factor: 1.38
Thermal conductivity at 23° C.: 19.0 mW/mK
Dimensional stability in accordance with DIN EN 1604/13165 (class 12): net at 70° C., 90% relative humidity: length: 0%, width: 0.85%, height: 0.35% at −20° C.: length: −0.05%, width: 0%, height: −0.1%

1.4 Production of the Rigid PU Foam (According to the Invention)

Polyphenylenepolymethylene polyisocyanate having a monomeric MDI content of 33%, 25% by weight of polyphenylenepolymethylene polyisocyanate having three aromatic rings, 10% by weight of polyphenylenepolymethylene polyisocyanate having four aromatic rings, 32% by weight of polyphenylenepolymethylene polyisocyanate having five or more aromatic rings, an NCO content of 31.5% by weight, a viscosity of 355 mPa·s at 25° C. and a uretonimine content of 9% was mixed with the polyol component 1 in a ratio of polyol:isocyanate=100:123 using a high-pressure metering machine. This mixture was injected into a lance mold (2000×200×50 mm) or a box mold (700×400×90 mm).

This gave a rigid PU foam which had the following characteristics:
Fiber time: 40 sec
Foam density: 29 g/l
Demolding thickness after 4 minutes at 15% overfilling: 92.2 mm
Flow factor: 1.40
Thermal conductivity at 23° C.: 18.7 mW/mK
Dimensional stability in accordance with DIN EN 1604/13165 (class 12): net at 70° C., 90% relative humidity: length: 0.2%, width: 0.9%, height: 1.1% at −20° C.: length: 0%, width: 0.1%, height: 0.1%

The invention claimed is:

1. A rigid polyurethane foam which is produced by reacting
   a) a polyisocyanate component with,
   b) at least one compound having at least two hydrogen atoms reactive with isocyanate groups, in the presence of
   c) a blowing agent consisting of water, or an alkane having at least 4 carbon atoms, or a cycloalkane having at least 4 carbon atoms, or a mixture thereof,
   wherein:
   the polyisocyanate component a) is a mixture comprising
   a1) 30-35% by weight of diphenylmethane diisocyanate,
   a2) 21-28% by weight of a polyphenylenepolymethylene polyisocyanate having three aromatic rings,
   a3) 8-13% by weight of a polyphenylenepolymethylene polyisocyanate having four aromatic rings, and
   a4) 24-41% by weight of a polyphenylenepolymethylene polyisocyanate having five or more aromatic rings,
   where the percentages by weight of the components a1) to a4) are based on the total weight of the components a1) to a4) and add up to 100% by weight;
   the at least one compound b) is a mixture comprising
   b1a) a polyether alcohol b1a) prepared by addition of ethylene oxide and propylene oxide onto an aromatic amine, and having a hydroxyl number ranging from 300 to 500 mg KOH/g,
   b1b) a polyether alcohol b1b) prepared by addition of ethylene oxide and propylene oxide onto an aromatic amine, and having a hydroxyl number ranging from 300 to 500 mg KOH/g, and
   b2) at least one polyether alcohol b2) prepared by addition of at least one alkylene oxide and glycerol onto a sugar;
   the component a) comprises less than 10% by weight, based on the weight of the component a), of uretonimine;
   a mean molecular weight of the polyether alcohol b1b) is greater than a mean molecular weight of the polyether alcohol b1a); and
   a weight ratio of a sum of the weights of the polyether alcohols b1a) and b1b) to the weight of the at least one polyether b2) ranges from 1:1 to 1:6.

2. The rigid polyurethane foam according to claim 1, wherein the component a) comprises less than 8% by weight, based on the weight of the component a), of uretonimine.

3. The rigid polyurethane foam according to claim 1, wherein the component a) has a content of free NCO end groups of from 30 to 33% by weight.

4. The rigid polyurethane foam according to claim 1 which comprises isocyanurate groups.

5. The rigid polyurethane foam according to claim 1, wherein at least one of the polyether alcohol b1a) and the polyether alcohol b1b) has been prepared by addition of ethylene oxide and propylene oxide onto toluenediamine.

6. The rigid polyurethane foam according to claim 5, wherein the toluenediamine comprises at least 95% by weight, based on the weight of the toluenediamine, of ortho isomers.

7. The rigid polyurethane foam according to claim 1, wherein the at least one polyether alcohol b2) is prepared by addition of propylene oxide and glycerol onto a sugar.

8. The rigid polyurethane foam according to claim 7, wherein the at least one polyether alcohol b2) is prepared by addition of propylene oxide and glycerol onto sucrose.

9. The rigid polyurethane foam according to claim 1, wherein:
   the polyether alcohols b1a) and b1b) are both prepared by addition of ethylene oxide and propylene oxide onto toluenediamine; and
   the at least one polyether alcohol b2) is prepared by addition of the at least one alkylene oxide and glycerol onto sucrose.

10. A process for producing a rigid polyurethane foam, the process comprising reacting
    a) a polyisocyanate component with
    b) at least one compound having at least two hydrogen atoms reactive with isocyanate groups in the presence of
    c) a blowing agent consisting of water, or an alkane having at least 4 carbon atoms, or a cycloalkane having at least 4 carbon atoms, or a mixture thereof,
    wherein:
    the polyisocyanate a) is a mixture comprising
    a1) 30-35% by weight of diphenylmethane diisocyanate,
    a2) 21-28% by weight of polyphenylenepolymethylene polyisocyanate having three aromatic rings,
    a3) 8-13% by weight of polyphenylenepolymethylene polyisocyanate having four aromatic rings, and
    a4) 24-41% by weight of polyphenylenepolymethylene polyisocyanate having five or more aromatic rings,
    where the percentages by weight of the components a1) to a4) are based on the total weight of the components a1) to a4) and add up to 100% by weight;
    the at least one compound b) is a mixture comprising
    b1a) a polyether alcohol b1a) prepared by addition of ethylene oxide and propylene oxide onto an aromatic amine, and having a hydroxyl number ranging from 300 to 500 mg KOH/g,
    b1b) a polyether alcohol b1b) prepared by addition of ethylene oxide and propylene oxide onto an aromatic amine, and having a hydroxyl number ranging from 300 to 500 mg KOH/g, and
    b2) at least one polyether alcohol b2) prepared by addition of at least one alkylene oxide and glycerol onto a sugar;
    the component a) comprises less than 10% by weight, based on the weight of the component a), of uretonimine;
    a mean molecular weight of the polyether alcohol b1b) is greater than a mean molecular weight of the polyether alcohol b1a); and
    a weight ratio of a sum of the weights of the polyether alcohols b1a) and b1b) to the weight of the at least one polyether b2) ranges from 1:1 to 1:6.

11. The rigid polyurethane foam according to claim 9, wherein the weight ratio of the sum of the weights of the polyether alcohols b1a) and b1b) to the weight of the at least one polyether alcohol b2) is from 1:1 to 1:1.27.

12. The rigid polyurethane foam according to claim 1, which has a core density of less than 38 g/l.

13. The rigid polyurethane foam according to claim 1, which has a core density of from 28 to 33 g/l.

14. The process according to claim 10, wherein:
    the blowing agent consists of water; and
    the rigid polyurethane foam has a core density of less than 38 g/l.

15. The process according to claim 10, wherein:
    the blowing agent consists of at least one of said alkane and said cycloalkane, and water; and
    the rigid polyurethane foam has a core density of from 28 to 33 g/l.

16. The process according to claim 15, wherein the blowing agent consists of water and n-pentane.

17. The process according to claim 15, wherein the blowing agent consists of water and cyclopentane.

18. The process according to claim 10, wherein the blowing agent consists of at least one of said alkane and said cycloalkane.

\* \* \* \* \*